United States Patent
Lee et al.

(10) Patent No.: US 9,715,871 B2
(45) Date of Patent: Jul. 25, 2017

(54) MULTILAYER DASH ISOLATION PAD HAVING SUPERIOR FORMABILITY AND SOUND ABSORPTION PERFORMANCE

(71) Applicants: Hyundai Motor Company, Seoul (KR); Kia Motors Corporation, Seoul (KR)

(72) Inventors: Jung Wook Lee, Gyeonggi-do (KR); Kil Bu Joo, Ulsan (KR); Won Jin Seo, Gyeonggi-do (KR); Dae Won Seo, Gyeonggi-do (KR); Bong Hyun Park, Gyeonggi-do (KR); Pan Ki Jung, Gyeonggi-do (KR); Kie Youn Jeong, Gyeonggi-do (KR); Seung Soo Ryu, Gyeonggi-do (KR); Keun Young Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/968,417

(22) Filed: Dec. 14, 2015

(65) Prior Publication Data
US 2017/0011729 A1    Jan. 12, 2017

(51) Int. Cl.
*B32B 27/32* (2006.01)
*G10K 11/168* (2006.01)
(Continued)

(52) U.S. Cl.
CPC ............ *G10K 11/168* (2013.01); *B32B 5/022* (2013.01); *B32B 5/18* (2013.01); *B32B 5/245* (2013.01);
(Continued)

(58) Field of Classification Search
CPC ............... B32B 27/32; B32B 307/102; B32B 2307/102; B32B 2367/00
(Continued)

(56) References Cited

U.S. PATENT DOCUMENTS 5,069,970 A  *  12/1991  Largman ................... D01F 6/92
                                                            428/364
5,299,133 A  *   3/1994  Kobsa .................... G01N 21/57
                                                            700/95
(Continued)

FOREIGN PATENT DOCUMENTS

CA          2886817 A1      4/2014
JP       2015-030218 A      2/2015
(Continued)

*Primary Examiner* — Forrest M Phillips
(74) *Attorney, Agent, or Firm* — Mintz Levin Cohn Ferris Glovsky and Popeo, P.C.; Peter F. Corless (57) ABSTRACT

The present invention provides a multilayer dash isolation pad having superior formability and sound absorption performance. The multilayer dash isolation pad includes a decoupler and a sound absorption and insulation layer. The decoupler is a soft felt manufactured from urethane foam or octalobal cross-section fiber, and the sound absorption and insulation layer includes a compressed felt manufactured from octalobal cross-section fibers. In particular, the shape factor ($\alpha$) of the octalobal cross-section fiber is 2.0 to 2.7. Particularly, the multilayer dash isolation pad according to the present invention does not decrease thickness or be contracted upon press molding after pre-heating felt, such that superior formability in components can be obtained and a sound absorption coefficient may be enhanced without increase in the weights and thicknesses of the decoupler and the sound absorption and insulation layer.

11 Claims, 5 Drawing Sheets

(51) Int. Cl.
  *B32B 5/02* (2006.01)
  *B32B 5/18* (2006.01)
  *B32B 5/24* (2006.01)
  *B32B 5/26* (2006.01)
  *B32B 27/06* (2006.01)
  *B32B 27/12* (2006.01)
  *B32B 27/30* (2006.01)
  *B60R 13/08* (2006.01)

(52) U.S. Cl.
  CPC .............. *B32B 5/26* (2013.01); *B32B 27/065* (2013.01); *B32B 27/12* (2013.01); *B32B 27/306* (2013.01); *B32B 27/32* (2013.01); *B60R 13/0838* (2013.01); *B32B 2262/0246* (2013.01); *B32B 2262/0253* (2013.01); *B32B 2262/0269* (2013.01); *B32B 2262/0284* (2013.01); *B32B 2262/04* (2013.01); *B32B 2262/12* (2013.01); *B32B 2274/00* (2013.01); *B32B 2307/102* (2013.01); *B32B 2367/00* (2013.01); *B32B 2605/003* (2013.01); *B32B 2605/08* (2013.01)

(58) Field of Classification Search
  USPC ........................................................ 181/286
  See application file for complete search history.

(56) References Cited

U.S. PATENT DOCUMENTS

| | | | | |
|---|---|---|---|---|
| 5,834,119 | A | * | 11/1998 | Roop ..................... D01D 5/253 428/397 |
| 7,431,128 | B2 | * | 10/2008 | Choi .................... B60R 13/0256 181/204 |
| 8,147,956 | B2 | * | 4/2012 | Miyauchi ................. D01F 8/06 428/373 |
| 2006/0113146 | A1 | | 6/2006 | Khan et al. |
| 2006/0201741 | A1 | * | 9/2006 | Inoue .................... G10K 11/168 181/204 |
| 2008/0121461 | A1 | * | 5/2008 | Gross ..................... B32B 27/12 181/286 |
| 2008/0156580 | A1 | * | 7/2008 | Harting ................. B60T 17/008 181/286 |

FOREIGN PATENT DOCUMENTS

| | | |
|---|---|---|
| KR | 2003-0000746 A | 1/2003 |
| KR | 2011-0034522 A | 4/2011 |
| KR | 10-1289129 B1 | 7/2013 |
| KR | 10-2014-0002734 A | 1/2014 |
| KR | 2014-0050214 A | 4/2014 |

* cited by examiner

FIG. 1

PRIOR ART

MULTILAYER DASH ISOLATION PAD HAVING SUPERIOR FORMABILITY AND SOUND ABSORPTION PERFORMANCE

CROSS-REFERENCE TO RELATED APPLICATION

This application claims under 35 U.S.C. §119(a) the benefit of priority to Korean Patent Application No. 10-2015-0098432 filed on Jul. 10, 2015, the entire contents of which are incorporated herein by reference.

BACKGROUND (a) Technical Field

The present invention relates to a multilayer dash isolation pad having superior formability and sound absorption performance. The multilayer dash isolation pad may include a compressed felt that is manufactured using octalobal cross-section fibers having an increased specific surface area compared to regular fiber and having a shape factor of 2.0 to 2.7, thereby providing enhanced N.V.H (Noise, Vibration, Hashness) and formability without increase of the weight and thickness of a decoupler and a sound absorption and insulation layer.

(b) Background Art

Figure 1:
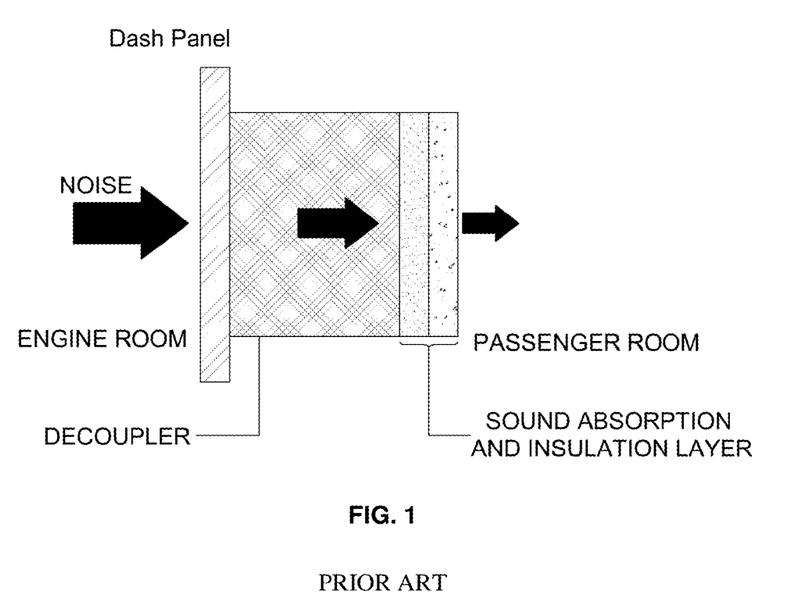
FIG. 1 illustrates a cross-sectional view of an exemplary dash isolation pad according to an exemplary embodiment of the present invention.

Vehicle dash isolation pads are based on a spring-mass structure as a structure for maximizing sound transmission loss and basically includes a decoupler functioning as a spring function and a sound absorption and insulation layer functioning as mass as illustrated in FIG. 1.

Generally, a decoupler is manufactured from urethane foam or soft felt, and a sound absorption and insulation layer is made of either a heavy layer or a compressed felt manufactured from a thermoplastic resin such as TPE or EVA, or a composite lamination of a heavy layer and a compressed felt that has been known as 'needle punched nonwoven fabric' in the related arts. In some small vehicles, the soft felt is used instead of urethane foam for weight reduction of components.

Conventionally, the density and thickness of decouplers and sound absorption and insulation layers have been increased to enhance sound transmission loss performance of dash isolation pad. However, when a density is continuously increased in given constant volume, structures of a cell and a pore may become unstable, thereby decreasing sound absorption and damping performance. In addition, thickness increase of components is limited due to interference relation with other components, and increase of the densities and thicknesses of multilayer materials leads to weight increase of components, thereby causing decrease in vehicle fuel efficiency. Therefore, it is important to enhance sound transmission loss performance by optimizing materials constituting a multilayer pad.

Figure 2:
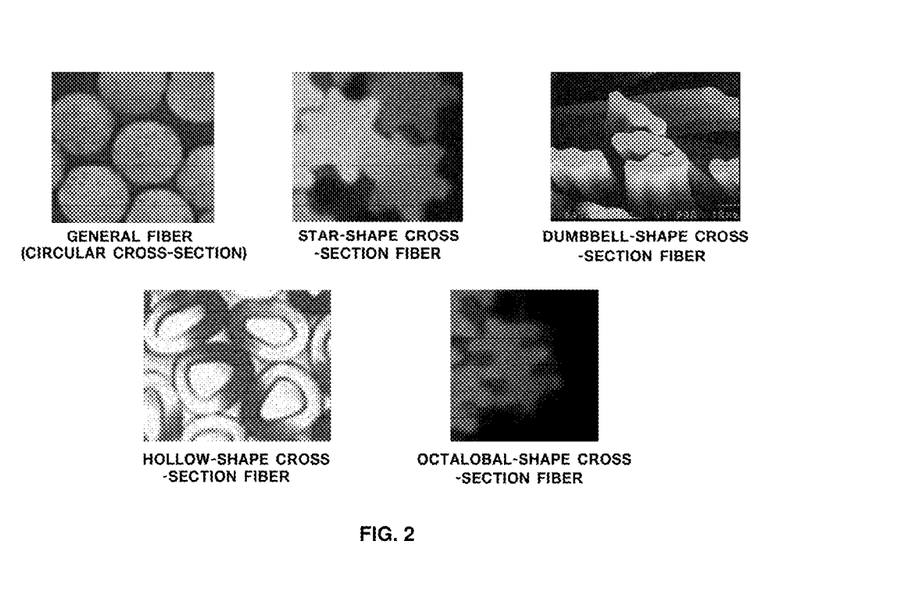
FIG. 2 illustrates exemplary cross-sectional shapes such as circular shape, star shape, dumbbell shape, hollow shape, octalobal shape of an exemplary modified cross-section fiber according to an exemplary embodiment of the present invention.

In related arts, Korean Patent No. 10-2011-0034522 reports a sound absorption material using a modified cross-section fiber and a method of manufacturing the same. As illustrated in FIG. 2, the modified cross-section fiber is utilized to enhance sound absorption performance by increasing a surface area in which sound waves can be disappeared with respect to circular cross-section fiber.

However, since the technology is limited to a technology for a fiber cross-section shape and plate-type felt and the shape of the plate-type felt is simple, the plate-type felt may be suitable for construction materials that are cut into a predetermined size without a molding process.

However, since the felt should be molded into a complex three-dimensional shape through a cooling press after heating at a temperature of about 180 to 200° C. to use as a sound absorption material of vehicle components, problems in component formability such as felt contraction due to excessive heat and surface collapse of felt may occur when the felt is used. Further, due to such a contraction phenomenon, there is still a limitation such as decrease in efficiency of sound transmission loss performance.

In dash isolation pads, felt is not used alone and used as a composite through composite-lamination with a decoupler, a heavy layer, and the like. As such, poor formability problems such as felt thickness decrease, non-uniform felt surfaces and compression elasticity decrease may be caused due to different heat contraction percentages between different materials.

Therefore, there is a need for a dash isolation pad having superior sound absorption performance while addressing problems, for example, formability such as felt thickness change, non-uniform felt surfaces and compression elasticity decrease, due to different heat contraction percentages between different materials.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with prior art.

The present inventors have conducted research into a multilayer dash isolation pad having superior sound absorption performance and simultaneously enhancing formability. When a compressed felt manufactured from octalobal cross-section fibers having a shape factor of 2.0 to 2.7 is included in the multilayer dash isolation pad, sound absorption and insulation efficiency may be improved and problems such as formability caused by different materials and the like may be solved, thereby completing the present invention.

In one aspect, the present invention provides a multilayer dash isolation pad that may include a decoupler, and a sound absorption and insulation layer. The decoupler may be a felt manufactured from urethane foam or octalobal cross-section fiber, and the sound absorption and insulation layer may include a compressed felt manufactured from octalobal cross-section fibers having a shape factor ($\alpha$) of 2.0 to 2.7.

The term "compressed felt" as used herein refers to a felt or material comprising a felt that is manufactured by compressing or pressing single or multiple nonwoven fabrics such that the compressed felt may be reduced overall thickness or increased density as compared to "non-compressed felt". For example, the compressed felt may be manufactured by needle-punching nonwoven fabrics of substantial amount or having substantial thickness.

The felt of the decoupler may be a "soft" felt comprising octalobal cross-section fiber. The soft felt may comprise a non-compressed felt manufactured by, for example, a conventional carding or airlaid system method.

The term "octalobal" as used herein refers to having a shape having eight lobes.

The shape factor ($\alpha$) may be represented by the following Equation 1, $$\text{Shape factor}(\alpha) = \frac{P}{\sqrt{4\pi A}} \quad \text{[Equation 1]}$$

wherein in the Equation 1, a cross-section circumference length (P) of the fiber is of about 200 to 250 µm, and a cross-sectional area (A) of the fiber is of about 700 to 800 µm².

Preferably, a width of the octalobal cross-section fiber may be of about 30 to 50 µm and a length of the octalobal cross-section fiber may be of about 20 to 30 µm. In addition, a thickness of the octalobal cross-section fiber may be of about 6 to 7 denier. Further, the octalobal cross-section fiber may comprise of about 9 to 15 crimps.

Preferably, a material of the octalobal cross-section fiber may be one or more selected from the group consisting of polyethylene terephthalate, polypropylene, acrylic, viscose rayon and aramid fiber.

The compressed felt may have an air permeability of about 20 to 35 cm³/(cm²·s). Preferably, the compressed felt may comprise an amount of about 50 to 70% by weight of the octalobal cross-section fiber and an amount of about 30 to 50% by weight of bicomponent PET fiber, based on the total weight of the compressed felt.

The sound absorption and insulation layer may further comprise an additional layer (e.g. a heavy layer) manufactured from one or more thermoplastic resins selected from the group consisting of thermoplastic elastomer (TPE) and ethylene vinyl acetate (EVA).

In another aspect, the present invention also provides a vehicle comprising the multilayer dash isolation pad as describe herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example both gasoline-powered and electric-powered vehicles.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a multilayer dash isolation pad that may include: a decoupler and a sound absorption and insulation layer. In particular, the decoupler may be a soft felt manufactured from urethane foam or octalobal cross-section fiber, the sound absorption and insulation layer may include a compressed felt manufactured from octalobal cross-section fibers, and a shape factor (α) of the octalobal cross-section fiber may be of about 2.0 to 2.7.

Figure 3:
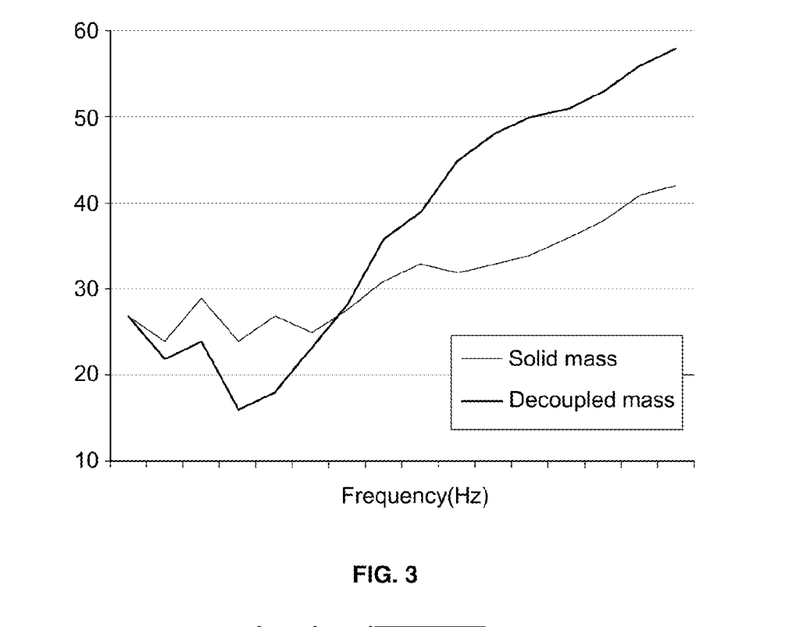
FIG. 3 is a graph illustrating that an exemplary multilayer pad including an exemplary decoupler has greater efficiency of loss of sound transmission, compared to a conventional monolayer pad according to an exemplary embodiment of the present invention.

As illustrated in FIG. 1, in order to maximize sound transmission loss, the dash isolation pad has been generally made of a decoupler manufactured from urethane foam or soft felt with a heavy layer alone or a compressed felt alone. Alternatively, the dash isolation pad has been made of a combination of a sound absorption and insulation layer formed through composite lamination of the heavy layer and the compressed felt, which is manufactured into a two or three-layer structure. As shown in sound transmission loss graphs of FIG. 3, the sound transmission loss increases by 12 dB per octave in the multilayer structure while sound transmission loss increases by 6 dB per octave in the monolayer structure.

The sound transmission loss is represented by the following Relational Equation 1, which shows that, when the weight of a decoupler or a sound absorption and insulation layer is increased, sound transmission loss proportionally increases.

$$TL = 20 \log_{10} m \cdot f - 10 \quad \text{[Relational Equation 1]}$$

However, the component weight increase leads to reduction in vehicle fuel efficiency. Further, substantial increase in weight in the decoupler or the compressed felt destabilizes an inner pore (cavity) structure, thereby decreasing sound absorption and insulation performance of a mid-low frequency band.

In addition, sound transmission loss may be represented by the following Relational Equation 2 with respect to a noise source and a pickup sound source. In a certain condition of specific noise source sound pressure (L1), pickup sound source sound pressure (L2) and a surface area of a sound absorption material (S), an equivalent sound absorption area of a sound absorption material (A) is increased to enhance sound transmission loss.

$$TL = L_1 - L_2 + 10 \log_{10} \frac{S}{A} \quad \text{[Relational Equation 2]}$$

Figure 4:
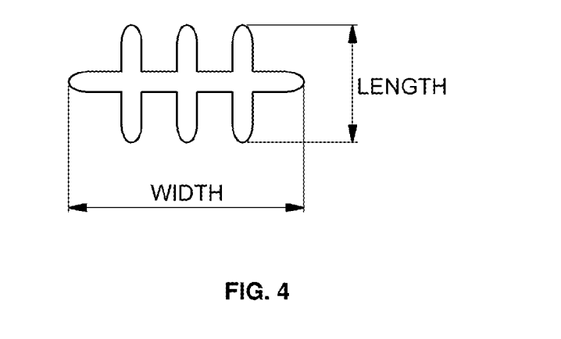
FIG. 4 illustrates width and length of an exemplary octalobal cross-section fiber according to an exemplary embodiment of the present invention.

Accordingly, in order to increase an equivalent sound absorption area of felt, the felt of the present invention may be manufactured using the octalobal cross-section fiber illustrated in FIG. 4. Further, the manufactured felt may be laminated into a multilayer structure illustrated in FIG. 5. As a result, sound transmission loss may be increased and thus permeation noise of an engine may be efficiently decreased.

The octalobal cross-section fiber (hereinafter, octalobal yarn) according to an exemplary embodiment of the present invention may be a modified cross-section fiber having a specific surface area increased by approximately 2.4 times per unit weight, compared to conventional circular cross-section or hollow cross-section fiber. In particular, in the octalobal cross-section fiber, the extinction efficiency of sound wave may be increased due to friction to a fiber surface.

However, for the vehicle dash isolation pad, when tertiary-shape vehicle components are molded using a multilayer structure including different materials, thickness decrease due to thermal contraction and performance efficiency decrease due to compression of a bent may occur. Accordingly, such fiber may be designed into a cross-sectional shape and fiber conditions may be designed considering properties of components.

The octalobal cross-section fiber according to an exemplary embodiment of the present invention may have a shape factor ($\alpha$) of about 2.0 to 2.7, and further have a cross-section circumference length (P) of about 200 to 250 μm and a cross-sectional area (A) of about 700 to 800 μm². The shape factor ($\alpha$) is represented by the following Equation 1. In the Equation 1, P means a fiber cross-section circumference length (μm) and A means a fiber cross-sectional area (μm²).

$$\text{Shape factor}(\alpha) = \frac{P}{\sqrt{4\pi A}} \quad \text{[Equation 1]}$$

The specific surface area of the fiber may be decreased when the fiber cross-section circumference length (P) is less than about 200 μm, as such sound absorption and insulation performance enhancement effects may not be sufficient and excessive contraction may occur upon heat molding due to fiber thickness decrease. When the fiber cross-section circumference length (P) is greater than about 250 μm, denier, or linear density of fiber may increase. This means that the number of fibers in a non-woven fabric at a specific area density may be decreased, such that sound absorption and insulation performance enhancement effects may be decreased and rigidity may be decreased after heat molding due to excess pores between fibers. Therefore, the fiber cross-section circumference length (P) may be within the range.

In addition, when the cross-sectional area (A) of the fiber is less than about 700 μm², it may be difficult to manufacture a spinneret having an octalobal cross-sectional shape using a current conventional technique and, after spinning, an octalobal cross-section structure of a fiber may not be suitably obtained. When the cross-sectional area (A) of the fiber is greater than about 800 μm², economic feasibility may be reduced due to fiber denier increase and spinning speed decrease, and, as described above, as excessive contraction and rigidity decrease may occur upon heat molding due to excess pores between fibers in felt. Therefore, the cross-sectional area (A) of the fiber may be within the range.

In addition, when the value of the shape factor ($\alpha$) is less than about 2.0, a fiber specific surface area may be decreased and thus sound absorption and insulation efficiency may be decreased, such that performance may not be improved sufficiently compared to conventional fibers. When the value of the shape factor ($\alpha$) is greater than about 2.7, there may be limitation in manufacturing a spinneret and obtaining a fiber having an octalobal structure after spinning. Therefore, the value of the shape factor ($\alpha$) may be within the range.

In addition, an exemplary backbone structure of the octalobal cross-section fiber is shown in FIG. 4. For easy spinning nozzle design and stable fiber properties, the width may be preferably of about 30 to 50 μm and the length may be preferably of about 20 to 30 μm, but the width and the length may be controlled for shape factor control.

A ratio of a width direction to a length direction (width/length) may be of about 1.0 to 2.5. When the ratio is less than about 1.0, a cross-sectional shape may become non-uniform due to adhesion between stems emerged from a length direction upon fiber spinning. In addition, when the ratio is greater than about 2.5, stems extending from a length direction may not properly possess the shapes and lengths thereof upon spinning due to characteristics of melt spinning and are rounded into a half moon shape. Therefore, anticipated shape factor might not be accomplished.

In addition, the thickness of the octalobal cross-section fiber may be preferably 6 to 7 denier. When the thickness is less than about 6 denier, it is difficult to form a modified cross-section structure having a shape factor of 2.0 or greater. When the thickness is greater than about 7 denier, the number of fibers per unit volume may be decreased and thus sound absorption and insulation performance may be decreased. Therefore, the thickness may be used within the range.

In addition, the number of crimps, that is, the number of crimps per unit length of the octalobal cross-section fiber may be preferably of about 9 to 15. When the number of crimps is less than about 9, compression stability of felt may be decreased and thus a designed thickness may be decreased upon press molding after pre-heating felt, such that sound absorption and insulation performance may be decreased. When the number of crimps is greater than about 15, bulkiness of felt may be excessive and thus workability may be decreased upon manufacturing non-woven fabric and press molding. Therefore, the number of crimps may be within the range.

The material of the octalobal cross-section fiber may be one or more materials, which may be melt-spun, selected from the group consisting of polyethylene terephthalate, polypropylene, acrylic, viscose rayon and aramid fiber.

Particularly, polyethylene terephthalate may be more preferable as the vehicle dash isolation pad since, when polyethylene terephthalate is used as a composite with other materials, press-molding may be suitably carried out after pre-heating.

Preferably, the compressed felt manufactured from octalobal cross-section fibers may have an air permeation degree of about 20 to 35 $cm^3/(cm^2 \cdot s)$. When the air permeation degree is less than about 20 $cm^3/(cm^2 \cdot s)$, air flow or permeation of sound waves into felt may be decreased and thus a sound absorption coefficient may be decreased. When the air permeation degree is greater than about 35 $cm^3/(cm^2 \cdot s)$, permeation of sound waves may be too high and thus sound transmission loss may be decreased. Therefore, the air permeation degree may be within the range.

The compressed felt may include an amount of about 50 to 70% by weight of the octalobal cross-section fiber and an amount of about 30 to 50% by weight of bicomponent PET fiber, based on the total weight of the compressed felt. When the amount of the octalobal cross-section fiber is less than about 50% by weight, the number of the octalobal cross-section fibers may be decreased per unit volume and thus sound absorption and insulation efficiency may be decreased. When the amount of the octalobal cross-section fiber is greater than about 70% by weight, the content of bicomponent PET fiber may be decreased and thus component shapes may not be sufficient after press molding. Therefore, the amount of the octalobal cross-section fiber may be within the range. However, the amount of the octalobal cross-section fiber may be controlled according to applied components and the type of different materials.

Figure 6:
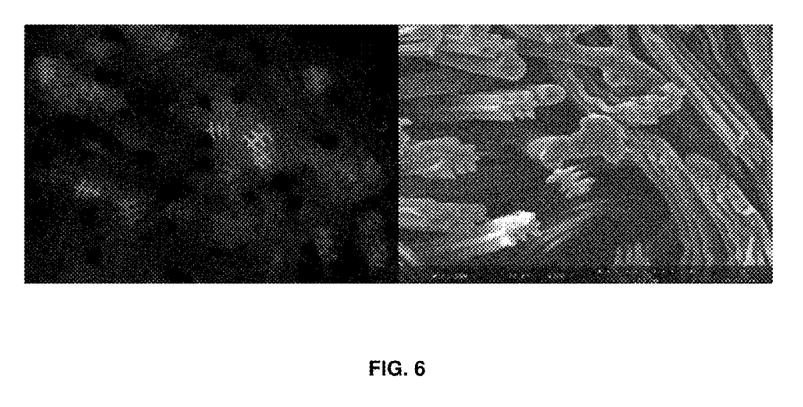
FIG. 6 illustrates an SEM image of an exemplary compressed felt manufactured from octalobal cross-section fibers according to an exemplary embodiment of the present invention.

FIG. 6 illustrates an SEM image of an exemplary compressed felt manufactured from the octalobal cross-section fiber according to an exemplary embodiment of the present invention and it can be confirmed that the octalobal cross-section fiber may be evenly distributed in felt. For reference, the compressed felt of the present invention may be a 'needle punched nonwoven fabric' in the art.

Figure 5:
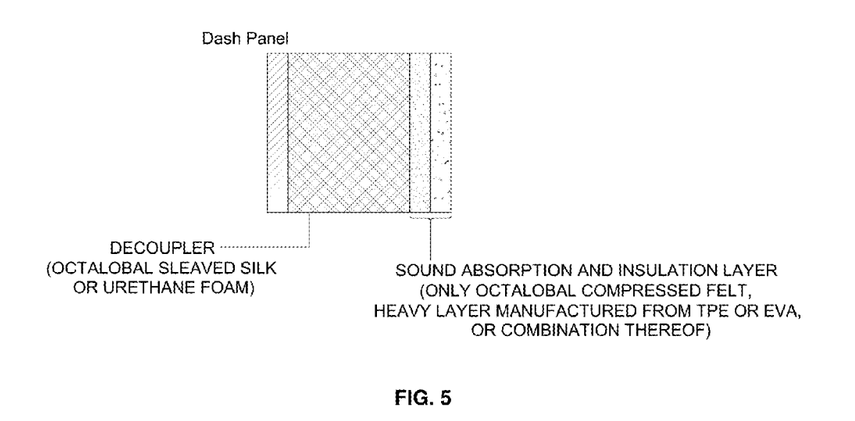
FIG. 5 illustrates an exemplary cross-sectional view of an exemplary multilayer dash isolation pad according to an exemplary embodiment of the present invention.

FIG. 5 illustrates a cross-sectional view of an exemplary multilayer dash isolation pad according to an exemplary embodiment of the present invention. In the figure, the decoupler may be a soft felt manufactured from urethane foam or octalobal cross-section fiber. The sound absorption and insulation layer may made only from (1) the compressed felt manufactured from octalobal cross-section fibers alone as described above, or (2) only from the heavy layer alone manufactured from one or more thermoplastic resins selected from the group consisting of thermoplastic elastomer (TPE) and ethylene vinyl acetate (EVA). Alternatively, the sound absorption and insulation layer may be a combination of (1) the compressed felt and (2) the heavy layer by compositely laminating the compressed felt and the heavy layer.

The soft felt manufactured from octalobal cross-section fibers of the decoupler may be manufactured by a general non-woven fabric manufacturing method such as a conventional carding or airlaid system method, and conditions of used octalobal cross-section fiber preferably are the same as those of octalobal cross-section fiber used when the compressed felt is manufactured.

The soft felt may include an amount of about 60 to 70% by weight of octalobal cross-section fiber and an amount of about 30 to 40% by weight of bicomponent PET fiber, based on the total weight of the felt. When the content of octalobal cross-section fiber is less than about 60% by weight, the number of octalobal cross-section fibers per unit volume may be decreased and thus sound absorption and insulation efficiency may be decreased. In addition, the content of bicomponent PET fiber may be increased and thus damping properties of the soft felt may be decreased. In addition, the content of the bicomponent PET fiber may be decreased when the content of the octalobal cross-section fiber is greater than about 70% by weight and thus a component shape may become poor after molding. Therefore, the content of the octalobal cross-section fiber may be within the range. However, the content of the octalobal cross-section fiber may be controlled according to the kinds of applied components and different materials.

The multilayer dash isolation pad according to an exemplary embodiment of the present invention may improve a sound absorption coefficient by about 28% or greater without increase in the weights and thicknesses of the decoupler and the sound absorption and insulation layer, as compared to a dash isolation pad including felt manufactured using general fiber (e.g., circular cross-section fiber).

In addition, since thickness decrease or contraction does not occur upon heat press molding after pre-heating felt, formability reinforcement performance of components and sound absorption and insulation performance of the pad may be maintained and shape factor may be enhanced compared to conventional modified cross-section fiber (for example, star-shape, dumbbell-shape or hollow-shape modified cross-section fiber), thereby decreasing the weight of the felt and cutting production costs.

As such, the present invention may provide a superior multilayer dash isolation pad that enhances formability of a pad and provides sound absorption performance.

EXAMPLE

Manufacturing Example 1 and Comparative Manufacturing Examples 1-1 to 1-4

Compressed Felt Manufacturing

Compressed felts were manufactured by a general needle punching system using cross-section fibers having conditions summarized in the following Table 1. Each felt composition included 70% by weight of cross-section fiber and 30% by weight of bicomponent PET fiber, based on the total weight of the felt composition.

TABLE 1

Conditions of cross-section fibers and compressed felts

| Classification | Manufacturing Example 1 | Comparative Manufacturing Example 1-1 | Comparative Manufacturing Example 1-2 | Comparative Manufacturing Example 1-3 | Comparative Manufacturing Example 1-4 |
| --- | --- | --- | --- | --- | --- |
| Area density of compressed felts (g/m$^2$) | 1600 | 1600 | 1600 | 1600 | 1600 |
| Thickness of compressed felt (mm) | 10 | 10 | 10 | 10 | 10 |
| Fiber cross-section structure | Octalobal type | Star shape | Circular shape | Dumbbell shape | Hollow shape |
| Fiber cross-sectional area (μm2) | 740 | 696 | 604 | 727 | 652 |
| Shape factor | 2.38 | 1.66 | 1.0 | 1.87 | 1.1 |

Test Example 1

Sound Absorption Coefficient Measurement According to Fiber Cross-Section Structure Alpha cabin sound absorption coefficients of compressed felts manufactured according to Manufacturing Example 1 and Comparative Manufacturing Examples 1-1 to 1-4 were evaluated based on ISO 354. Results are summarized in the following Table 2.

TABLE 2

Results for average sound absorption coefficients

| Classification | Manufacturing Example 1 | Comparative Manufacturing Example 1-1 | Comparative Manufacturing Example 1-2 | Comparative Manufacturing Example 1-3 | Comparative Manufacturing Example 1-4 |
| --- | --- | --- | --- | --- | --- |
| Average sound absorption coefficient | 0.87 | 0.81 | 0.74 | 0.79 | 0.83 |

As shown in Table 2, it can be confirmed that the compressed felt manufactured from octalobal cross-section fibers (Manufacturing Example 1) according to an exemplary embodiment of the present invention may obtain an enhanced average sound absorption coefficient by 7.4 to 17.5%, compared to compressed felt manufactured from fiber having a different cross-section structure (Comparative Manufacturing Examples).

Test Example 2

Heat-Resistance Compression Elasticity Measurement

A 1 kg weight was applied to compressed felts manufactured according to Manufacturing Example 1 and Comparative Manufacturing Examples 1-1 to 1-4 at a temperature of 120° C. for 24 hours and then compression elasticity was measured based on JIS 1096. Results are summarized in the following Table 3.

TABLE 3

Results of compression elasticity

| Classification | Manufacturing Example 1 | Comparative Manufacturing Example 1-1 | Comparative Manufacturing Example 1-2 | Comparative Manufacturing Example 1-3 | Comparative Manufacturing Example 1-4 |
|---|---|---|---|---|---|
| Compression elasticity (%) | 99 | 89 | 83 | 87 | 93 |

As shown in Table 3, it can be confirmed that the compressed felt manufactured from octalobal cross-section fibers according to an exemplary embodiment of the present invention (Manufacturing Example) may obtain enhanced compression elasticity by 8.9 to 16.8%, compared to the compressed felts manufactured from fibers having other cross-section structures (Comparative Manufacturing Examples).

Manufacturing Example 2 and Comparative Manufacturing Examples 2-1 to 2-5

Manufacturing of Compressed Felt

Compressed felts were manufactured by a general needle punching system using cross-section fibers having conditions summarized in the following Table 3. Here, each felt composition included 70% by weight of cross-section fiber and 30% by weight of bicomponent PET fiber, based on the total weight of the felt composition.

TABLE 4

Conditions for cross-section fibers and compressed felts

| Classification | Manufacturing Example 2 | Comparative Manufacturing Example 2-1 | Comparative Manufacturing Example 2-2 | Comparative Manufacturing Example 2-3 | Comparative Manufacturing Example 2-4 | Comparative Manufacturing Example 2-5 |
|---|---|---|---|---|---|---|
| Area density of compressed felt (g/m$^2$) | 1000 | 1000 | 1000 | 1000 | 1000 | 1000 |
| Thickness of compressed felt (mm) | 5 | 5 | 5 | 5 | 5 | 5 |
| The number of crimps | 14 | 8 | 8 | 8 | 8 | 8 |
| Fiber cross-section structure | Octalobal | Octalobal | Circular | Star shape | Dumbbell shape | Hollow shape |

Test Example 3

Contraction Rate Measurement Upon Heat Molding

Compressed felt manufactured according to Manufacturing example 2 and Comparative Manufacturing Examples 2-1 to 2-5 was hot-blast-heated at a temperature of 180° C. for 240 seconds and then pressed, followed by freezing. Subsequently, thickness decrease ratios were measured and sound absorption coefficients in the same manner as in Test Example 1 were additionally measured. Results are summarized in the following Table 5.

TABLE 5

Results for thickness reduction ratios and average sound absorption coefficients

| Classification | Manufacturing Example 2 | Comparative Manufacturing Example 2-1 | Comparative Manufacturing Example 2-2 | Comparative Manufacturing Example 2-3 | Comparative Manufacturing Example 2-4 | Comparative Manufacturing Example 2-5 |
|---|---|---|---|---|---|---|
| Thickness reduction ratio (%) | 0.1 | 0.8 | 2.3 | 1.2 | 1.6 | 0.9 |
| Average sound absorption coefficients | 0.40 | 0.36 | 0.33 | 0.35 | 0.34 | 0.36 |

As shown in Table 5, it can be confirmed that the compressed felt manufactured from octalobal cross-section fibers according to an exemplary embodiment of the present invention (Manufacturing Example 2) may obtain a low thickness reduction ratio and, accordingly, superior sound absorption efficiency, compared to compressed felts manufactured from fiber having a different cross-section structure (comparative manufacturing examples).

Example and Comparative Example

Manufacture of Dash Isolation Pads (PAD)

Example

The compressed felt manufactured according to Manufacturing Example 2 and an EVA sheet having a specific gravity of 1.7, and a thickness of 2.0 mm were laminated and bonded through a heat pressing process. Subsequently, a generally used urethane foam was foamed on the back thereof at a density of 80 kg/m³, thereby manufacturing a dash isolation pad (PAD).

Comparative Example

A dash isolation pad (PAD) was manufactured in the same manner as in the example, except that compressed felt manufactured according to Comparative Manufacturing Example 2-2 was used.

Test Example 4

Measurement of Sound Absorption Coefficients of Dash Isolation Pads (PADs)

Figure 7:
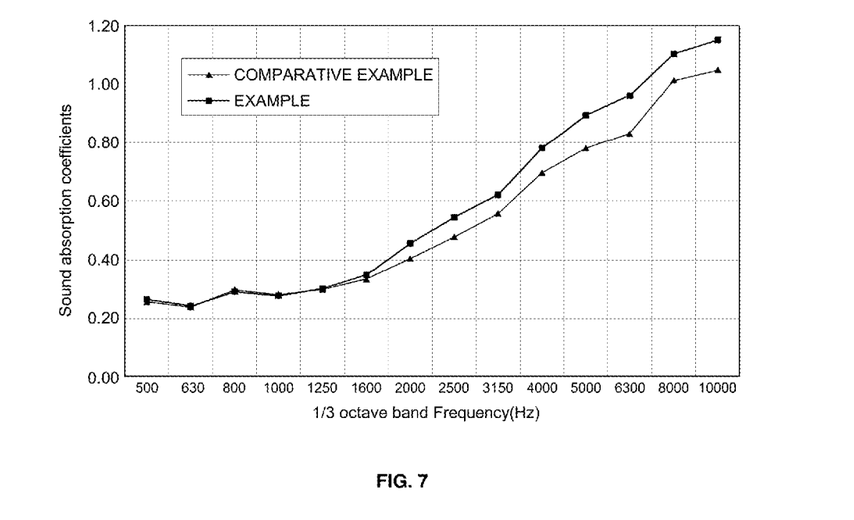
FIG. 7 is a graph of sound absorption coefficients of dash isolation pads from the Example according to an exemplary embodiment of the present invention and the Comparative Example.

Alpha cabin sound absorption coefficients of dash isolation pads (PADs) manufactured according to the Examples and the Comparative Example were evaluated based on ISO 354, and results are illustrated using graphs in FIG. 7.

As illustrated in FIG. 7, it can be confirmed that sound absorption performance of the dash isolation pad of the example is superior at 1,600 Hz and above, compared to the dash isolation pad of the comparative example. Particularly, it can be confirmed that the sound absorption coefficient of the example is much greater than that of the comparative example at 2 KHz and above which is the sound frequency of a main area of engine permeation sound, and the sound absorption coefficient in the example is increased by 28%.

In general, the weight of the dash isolation pad of the Comparative Example should be increased to minimum 200 g/m² or greater to increase the sound absorption coefficient of the dash isolation pad of the Comparative Example to the sound absorption coefficient state of the dash isolation pad of the example. In contrast, the multilayer dash isolation pad according to an exemplary embodiment of the present invention may provide a superior sound absorption coefficient without increase in the weight and the thickness of a decoupler and a sound absorption and insulation layer, compared to a conventional dash isolation pad, and thus, component weight reduction may be ultimately realized.

The multilayer dash isolation pad according to various exemplary embodiments of the present invention may be manufactured into various types according to component shapes by addressing problems in formability such as felt thickness change, non-uniform felt surfaces and extrusion elasticity may decrease due to different heat contraction percentages between different materials.

In addition, since the dash isolation pad according to the present invention includes compressed felt manufactured from octalobal cross-section fibers having a shape factor of about 2.0 to 2.7, shape factor may be enhanced with respect to conventional modified cross-section fibers, thereby decreasing a use amount of felt and production costs and improving the sound absorption coefficient of the pad by about 28% or greater.

The invention has been described in detail with reference to preferred exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A multilayer dash isolation pad comprising:
   a decoupler; and
   a sound absorption and insulation layer,
   wherein the decoupler is a felt manufactured from urethane foam or octalobal cross-section fiber, and
   wherein the sound absorption and insulation layer comprises a compressed felt manufactured from octalobal cross-section fibers, and a shape factor ($\alpha$) of the octalobal cross-section fiber is of about 2.0 to 2.7,
   wherein the shape factor ($\alpha$) is represented by the following Equation 1.

$$\text{Shape factor}(\alpha) = \frac{P}{\sqrt{4\pi A}} \qquad \text{[Equation 1]}$$

wherein a cross-section circumference length (P) of the fiber is of about 200 to 250 µm, and a cross-sectional area (A) of the fiber is of about 700 to 800 µm².

2. The multilayer dash isolation pad according to claim 1, wherein a width of the octalobal cross-section fiber is of about 30 to 50 μm and a length of the octalobal cross-section fiber is of about 20 to 30 μm.

3. The multilayer dash isolation pad according to claim 1, wherein a thickness of the octalobal cross-section fiber is of about 6 to 7 denier.

4. The multilayer dash isolation pad according to claim 1, wherein the octalobal cross-section fiber comprises of about 9 to 15 crimps.

5. The multilayer dash isolation pad according to claim 1, wherein a material of the octalobal cross-section fiber is one or more selected from the group consisting of polyethylene terephthalate, polypropylene, acrylic, viscose rayon and aramid fiber.

6. The multilayer dash isolation pad according to claim 1, wherein the compressed felt has an air permeability of about 20 to 35 $cm^3/(cm^2 \cdot s)$.

7. The multilayer dash isolation pad according to claim 1, wherein the compressed felt comprises an amount of about 50 to 70% by weight of the octalobal cross-section fiber and an amount of about 30 to 50% by weight of bicomponent PET fiber, based on the total weight of the compressed felt.

8. The multilayer dash isolation pad according to claim 1, wherein the sound absorption and insulation layer further comprises an additional layer manufactured from one or more thermoplastic resins selected from the group consisting of thermoplastic elastomer (TPE) and ethylene vinyl acetate (EVA).

9. The multilayer dash isolation pad according to claim 1, wherein the felt of the decoupler is a soft felt or a non-compressed felt.

10. The multilayer dash isolation pad according to claim 1, wherein the compressed felt is formed by needle-punching of non-woven fabrics.

11. A vehicle comprising a multilayer dash isolation pad of claim 1.

* * * * *